United States Patent [19]

Orain

[11] Patent Number: 5,030,168
[45] Date of Patent: Jul. 9, 1991

[54] ARTICULATED TRANSMISSION JOINT HAVING A LARGE TELESCOPIC TRAVEL IN PARTICULAR FOR AN AUTOMOBILE

[75] Inventor: Michel Orain, Conflans-Ste-Honorine, France

[73] Assignee: Glaenzer Spicer, Poissy, France

[21] Appl. No.: 263,411

[22] Filed: Oct. 24, 1988

[30] Foreign Application Priority Data

Oct. 28, 1987 [FR] France ............... 87 14917

[51] Int. Cl.$^5$ ........................... F16D 3/205
[52] U.S. Cl. .................... 464/111; 464/132; 464/905
[58] Field of Search ............ 464/111, 120, 122, 123, 464/124, 132, 905

[56] References Cited

U.S. PATENT DOCUMENTS 4,592,735 6/1986 Orain .................... 464/111

FOREIGN PATENT DOCUMENTS 239427 9/1987 European Pat. Off. ........... 464/111
2525306 10/1983 France .
2580750 10/1986 France ................... 464/111

*Primary Examiner*—Daniel P. Stodola
*Attorney, Agent, or Firm*—Wenderoth, Lind & Ponack

[57] ABSTRACT

In an articulated transmission joint for automobiles, there is provided a large telescopic range of travel for the joint. A first shaft having a tripod element composed of three radial arms is joined to another shaft with a bowl element. The bowl element is provided with rolling tracks therein. Each arm of the tripod element has two roller segments pivotable thereabout. The roller segments are in rolling contact with the rolling tracks of the bowl element. Each set of roller segments not only has an arrangement for limiting the angular range of movement of the roller segments about their respective arms, but also is provided with an arrangement for limiting the range of telescopic movement of the arms to a maximum extension and a maximum compression position. This arrangement further ensures that the roller segments are at their respective limits of angular movement about each arm when their arm is at an end point of its range of movement in the bowl element. The above-mentioned arrangement is provided by abutments on the roller segments for cooperation in engagement with abutments of the bowl element. The abutments of the bowl element may be formed in the bowl element itself, or may be formed on a clip provided in the bowl element. The joint ensures, in a reliable manner, a large telescopic range of travel.

17 Claims, 9 Drawing Sheets

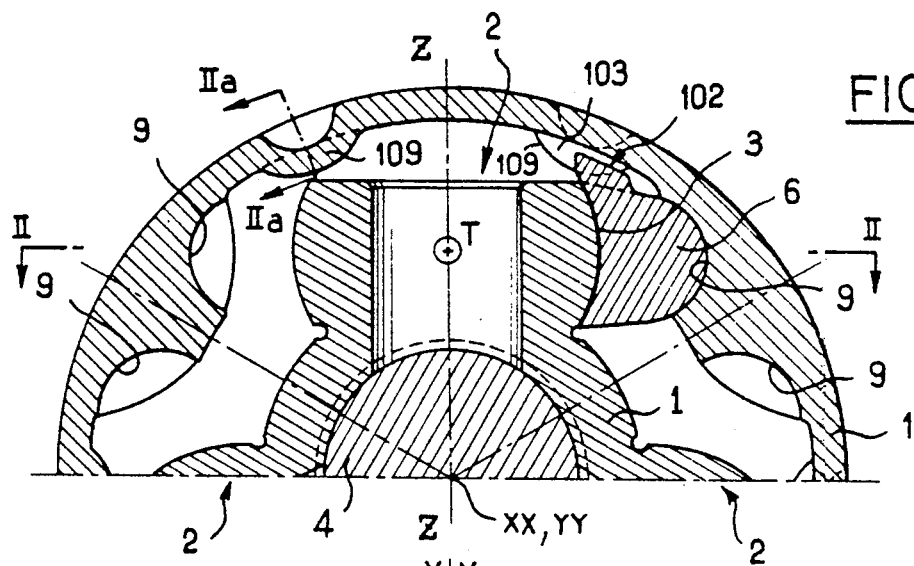
FIG_1
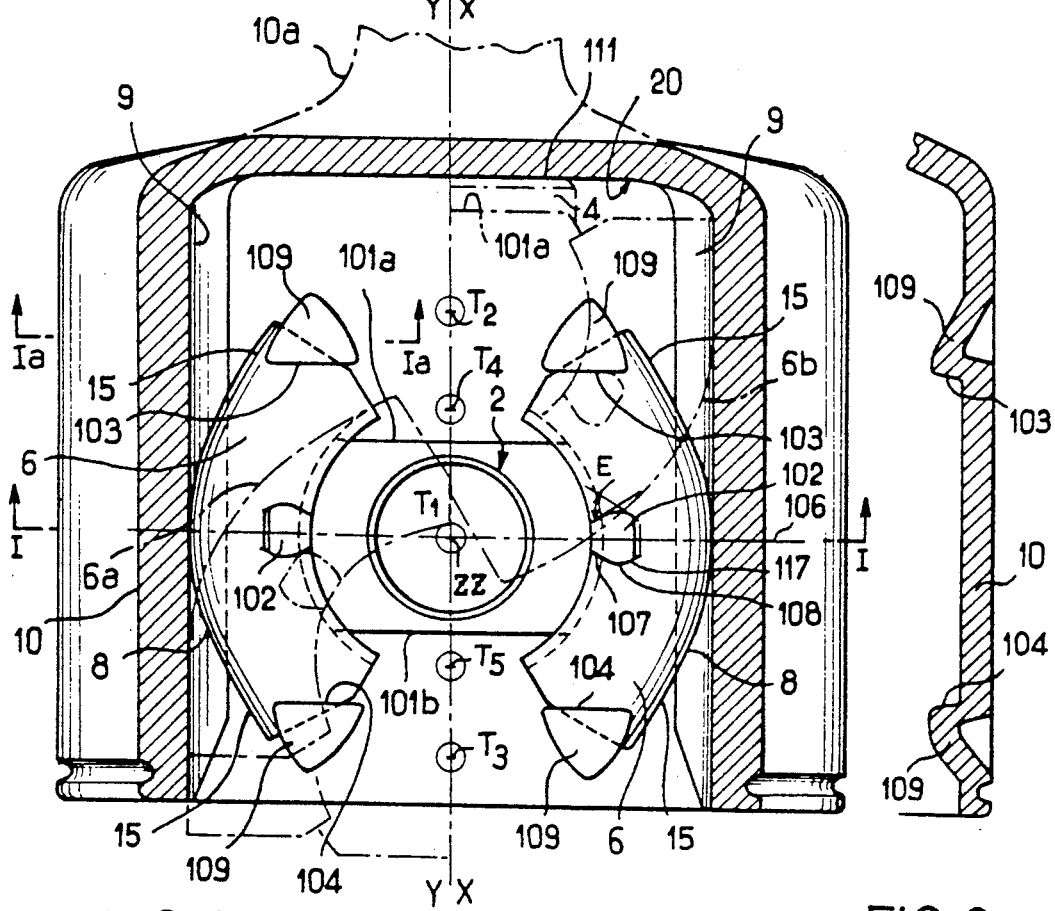
FIG_2          FIG_2a

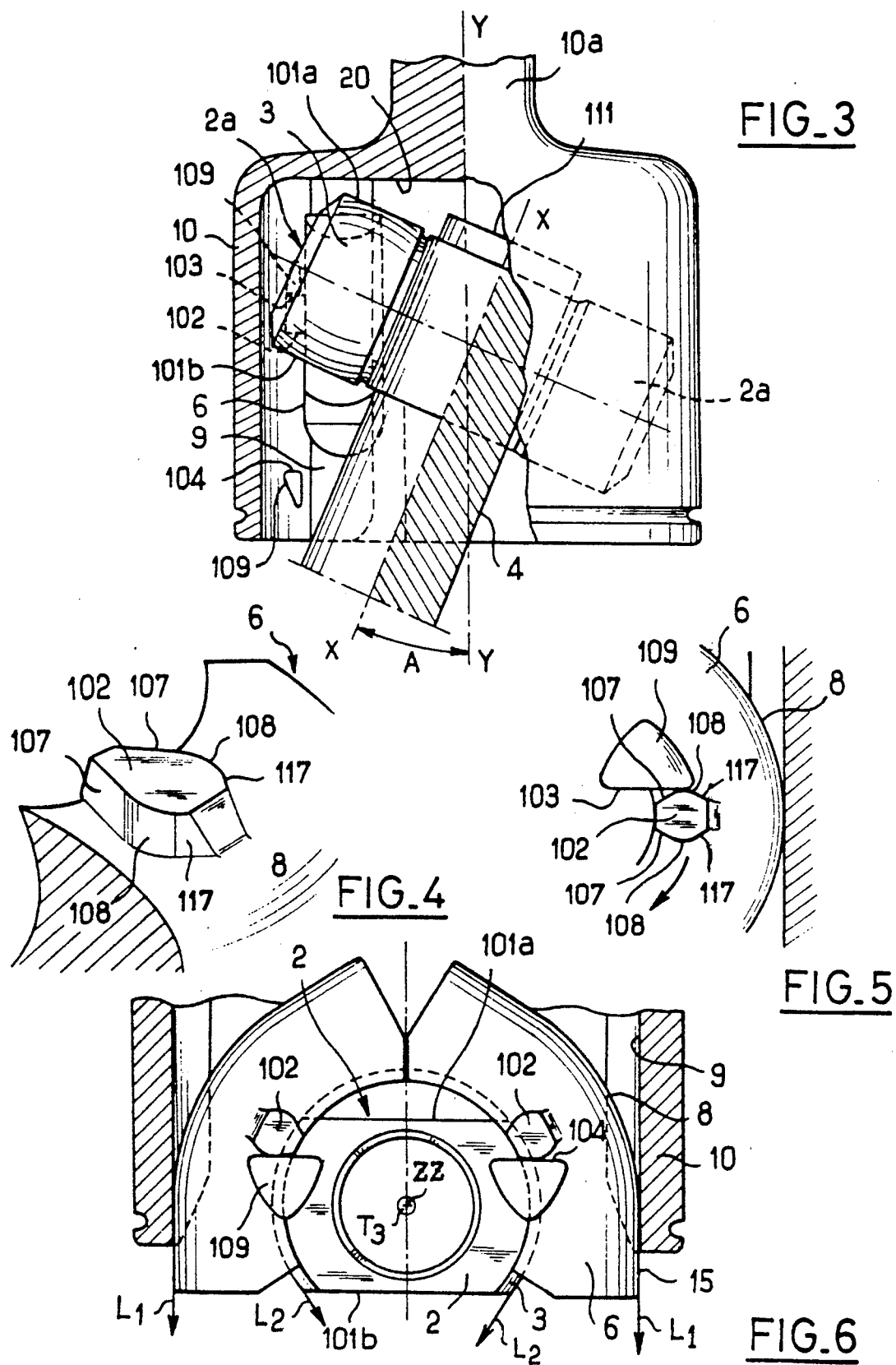

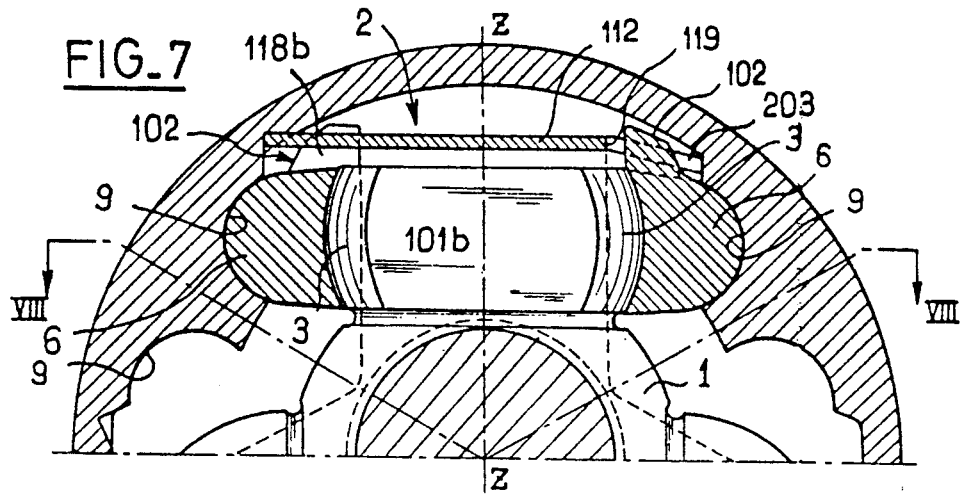
FIG._7
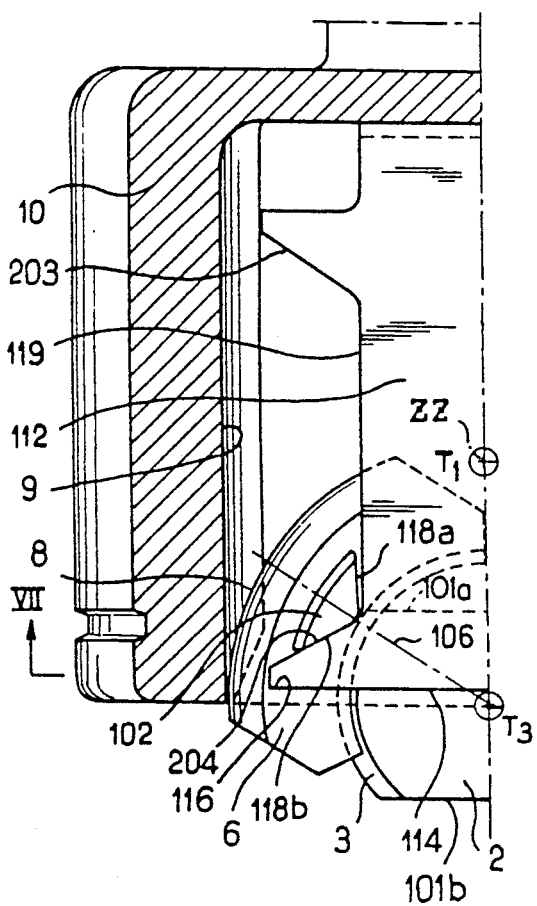
FIG._8A
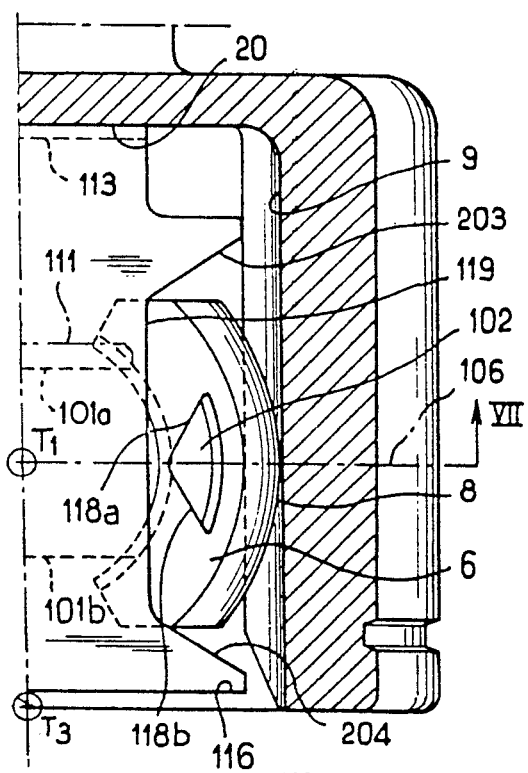
FIG._8B
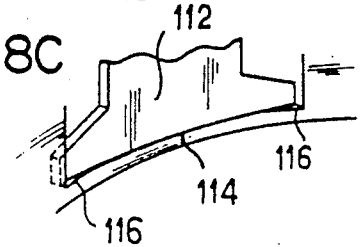
FIG._8C

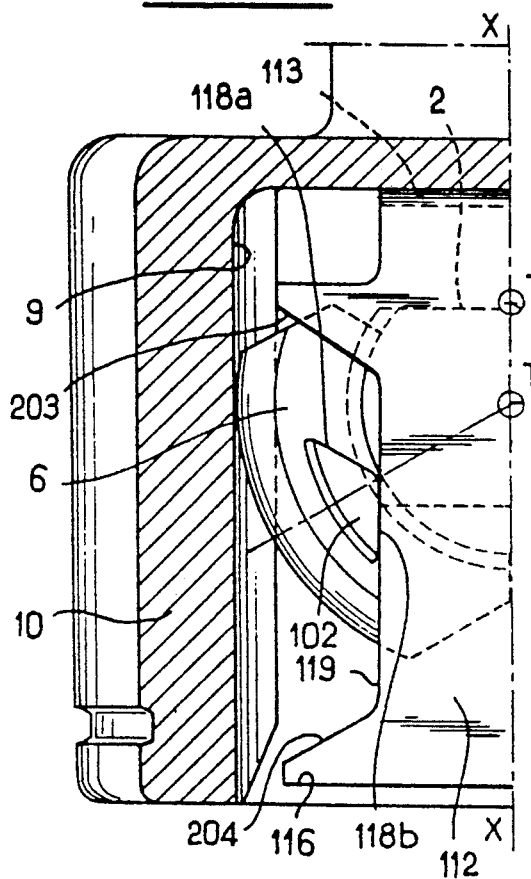
FIG_9A
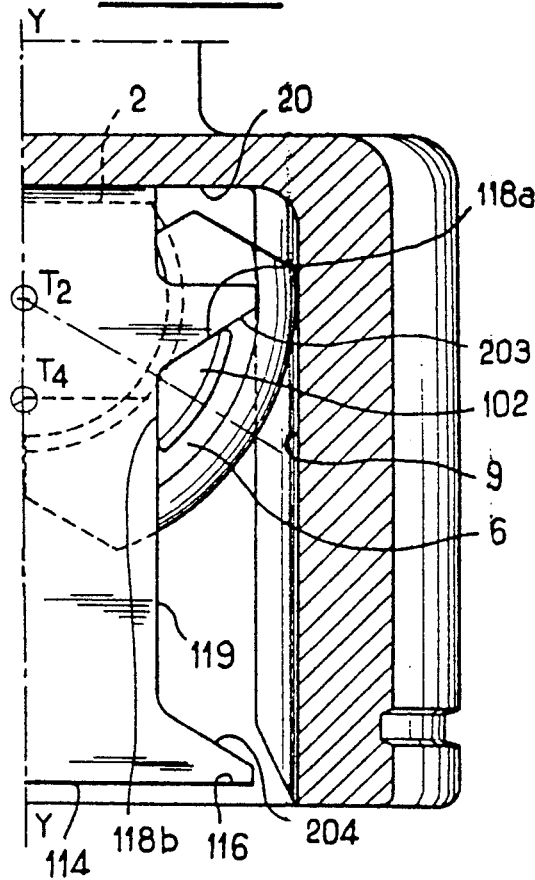
FIG_9B
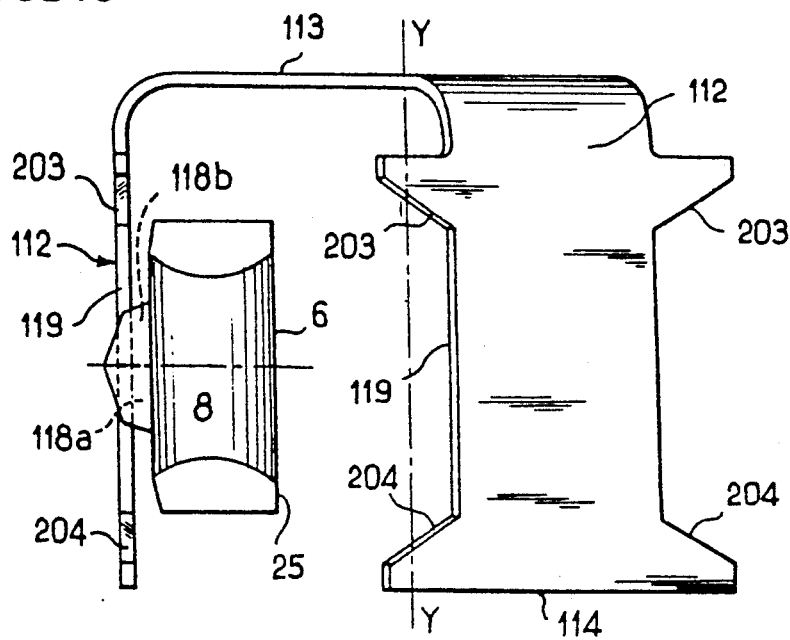
FIG_10

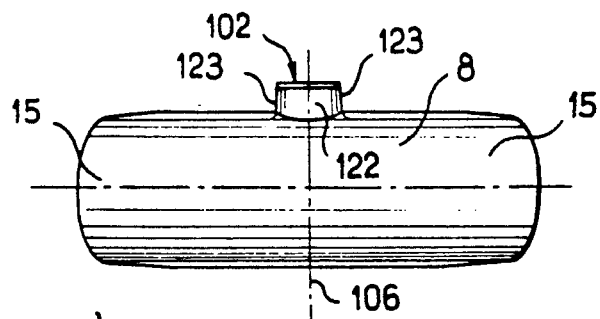
FIG_14
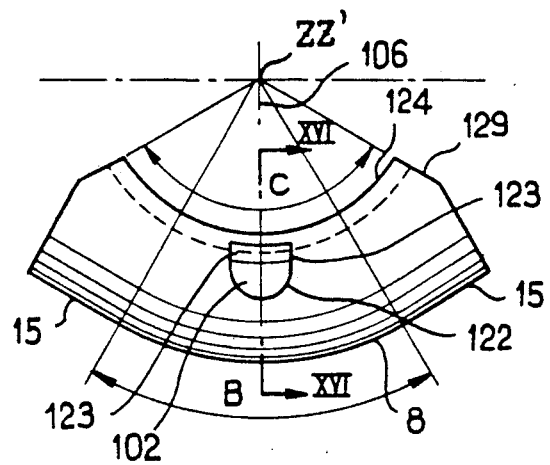
FIG_15
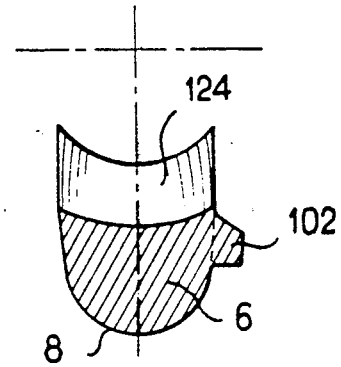
FIG_16
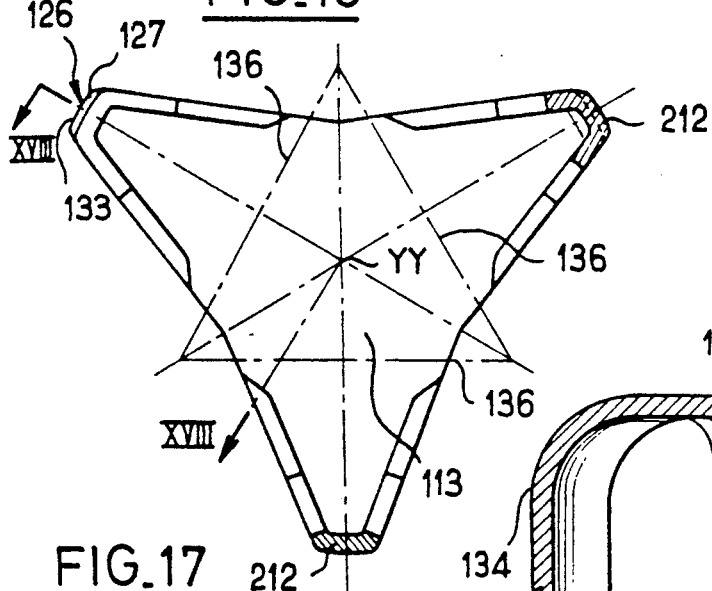
FIG_17
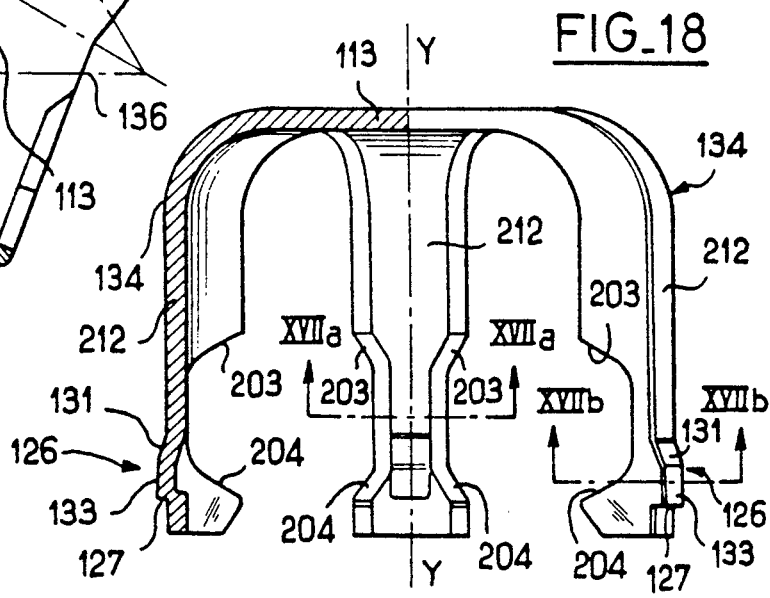
FIG_18

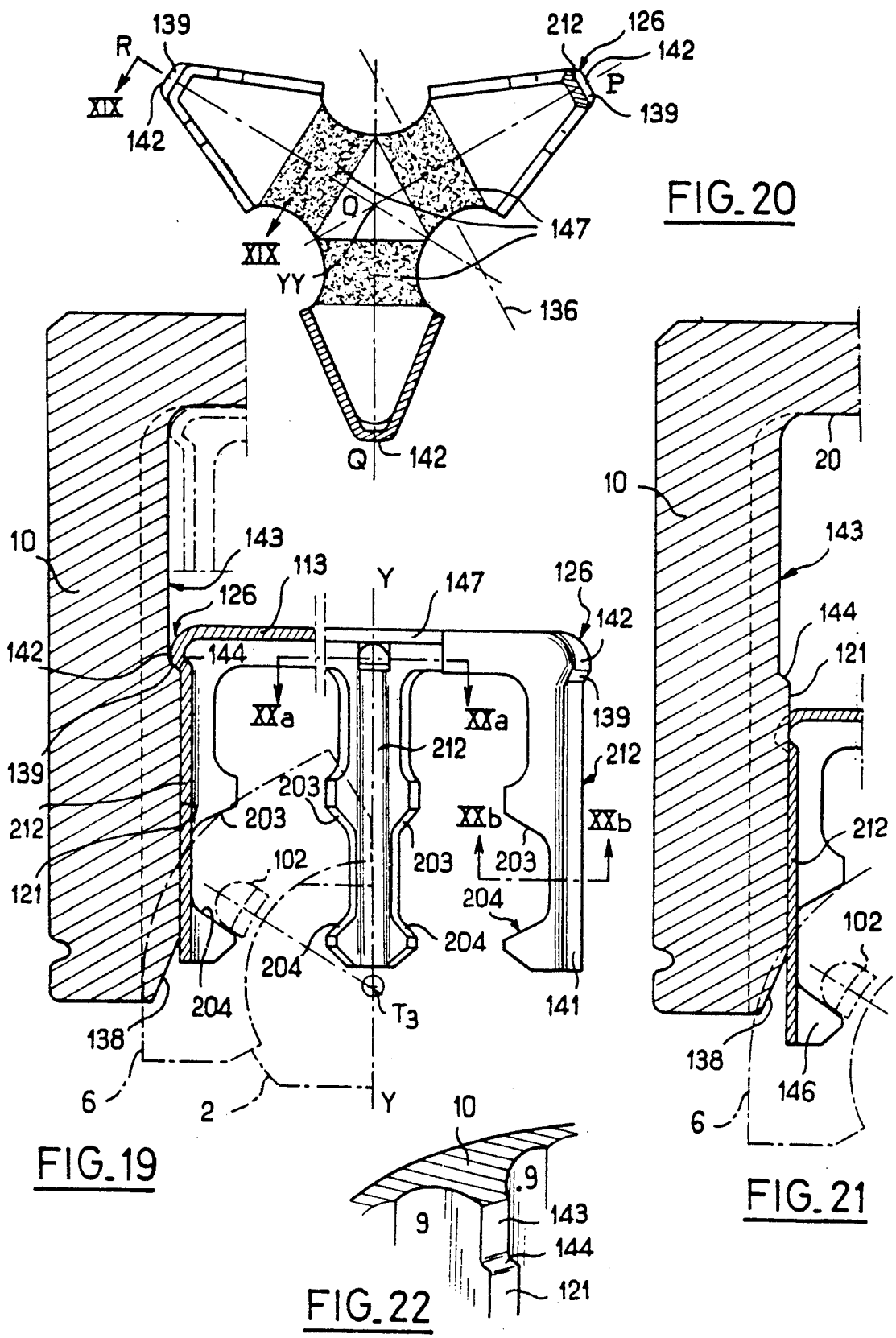

ARTICULATED TRANSMISSION JOINT HAVING A LARGE TELESCOPIC TRAVEL IN PARTICULAR FOR AN AUTOMOBILE

BACKGROUND OF THE INVENTION (1) Field of the Invention

The present invention relates to an articulated transmission joint, having a large telescopic travel, in particular for an automobile.

The invention is in particular applicable to homokinetic transmission joints comprising a first element, or tripod element, provided with three arms disposed substantially radially relative to its axis and each partly surrounded by two roller segments whose radially outer surfaces, having a curved transverse contour, are in rolling and sliding contact with longitudinal tracks of a second element. Usually, the longitudinal tracks are formed on the inner side of a hollow element of generally cylindrical shape termed a "bowl element" or "barrel element" surrounding the tripod element.

(2) State of the Prior Art

Such a joint is disclosed in the unpublished French patent application No. 86 17044 in the name of the Applicant. This joint has excellent features of comfort and compactness. It is simple and cheap and therefore very competitive.

In service, the movements of each arm of the tripod element, as resulting from the telescopic movement of the joint, or from the operation at a flexing angle of the joint, result in principle in a non-sliding rolling of the roller segments on their respective rolling track. This rolling movement is such that, when an arm of the tripod element travels toward either of the ends of its axial travel in the barrel element, the associated roller segments move away toward the rear of the arm relative to the considered direction of axial movement. This in principle permits giving to the joint a reduced axial overall size for a given movement capacity.

However, this capacity of movement, defined by the extent of the angularity-sliding diagram, depends on the reliability with which the roller segments take up their well-defined position corresponding to their minimum axial overall size when the joint is at the end of its compression or extension travel.

In order to ensure this reliability, the aforementioned patent application proposes meshing the roller segments with racks provided in the barrel element along the rolling tracks. However, the racks only allow the telescopic movement by the rolling of the roller segments, which limits the telescopic travel substantially to the circumferential length of the toric outer wall of the roller segments. This is counter to the intended objective, which is to provide the longest possible sliding length for a given angularity and diameter of the joint.

SUMMARY OF THE INVENTION

An object of the present invention is to provide a device which increases the movement of the joint without adversely affecting its overall size and its manufacturing or assembling cost.

The invention provides a telescopic articulated transmission joint, in particular for a vehicle, comprising a first element provided with three arms disposed substantially radially relative to its axis and each partly surrounded by two roller segments whose radially outer surfaces, having a curved transverse contour, bear against longitudinal tracks of a second element relative to which each arm of the first element is movable in a predetermined telescopic travel, wherein the roller segments, on the one hand, and the second element, on the other hand, carry abutment means which, when the arms are substantially at the end of their telescopic travel, retain by an at least indirect mutual bearing relation the roller segments in a clearance position in which they clear a region in front of the arms relative to the movement toward said end of the telescopic travel. Angular travel limiting means are provided for limiting the angular travel of the roller segments about the associated arms, and, when the arms are in an intermediate region of their telescopic travel, the abutment means permit a free angular positioning of the roller segments around the arms within the limits defined by the angular travel limiting means.

The abutment means according to the invention are effective to ensure that the roller segments move away in front of the arms when the latter arrive at the end of the telescopic travel.

On the other hand, in contrast to the segments having a rack disclosed in the French patent application No.86 17044, the roller segments according to the invention freely position themselves about the arms when the arms are in the intermediate region of their telescopic travel. Thus, this intermediate region may be as long as is desired so that the total telescopic travel is larger than the circumferential length of the outer wall of the roller segments. When a roller segment reaches the extreme angular position about the associated arm, the remainder of the telescopic travel results in a sliding of the roller segment on the associated rolling track. When an arm travels toward the end of its travel, the mutual bearing relation of the abutment means occurs the as soon as the associated roller segment is in an unfavorable angular position for arriving at the end of the travel. This mutual bearing relation constrains the roller segment to assume its clearance position while the arm continues its movement.

The abutment means provided in accordance with the invention may be operative at either of the ends of the telescopic travel of each arm, or at both ends thereof.

If the abutment means are in mutual bearing relation when the arms are at an end of the telescopic travel corresponding to the maximum extension of the joint, it is advantageous to arrange that the angular travel limiting means define for the roller segments in the vicinity of their angular clearance position, a limit angular position in which the inner surfaces of the two roller segments associated with each arm have regions which converge in the direction away from the second element so as to retain the arms therebetween and thereby define to end of the telescopic travel.

In this way there is achieved a locking of the assembled joint without any additional member, this locking precluding any undesired coming apart during the handling when storing or mounting on the production line. This dispenses with the anti-disassembly caps of conventional type which are costly, space-consuming, and are liable to result in leakages of lubricant, and which in any case, constitute a hindrance in the event of repairs.

The abutment means of the roller segments may be bosses carried laterally by the segments. Each roller segment may carry one or more of such bosses, but preferably there is a single boss having two abutment regions, each region adapted to be in at least indirect bearing relation to the abutment means of the second element at a respective one of the ends of the telescopic travel.

In practice, this boss may come into sliding or non-sliding bearing relation to complementary abutment surfaces provided in the barrel element or an intermediate steel member which cooperates in turn with the abutment means of the second element or barrel element so as to place the roller segment in the position clearing the path of the associated arm toward the end of its travel.

Further features and advantages of the invention will be apparent from the following description.

BRIEF DESCRIPTION OF THE DRAWINGS

In the accompanying drawings, given by way of non-limitative examples :

FIG. 1 is a cross-sectional view of a first embodiment of the join according to the invention taken along the plane I-13 I, and in respect of a detail of the bowl element, along a plane Ia—Ia, of FIG. 2, a single roller segment being shown;

FIG. 2 is a side elevational view of a section of the bowl element along plane IIa—IIa of FIG. 1;

FIG. 2a is a partial sectional view along plane II—II of FIG. 1;

FIG. 3 is an elevational view, partly in axial section, of the joint operating at a flexing angle;

FIG. 4 is a section and perspective view of a roller segment;

FIG. 5 is a partial view of a roller segment whose abutment boss comes into contact with an abutment of the bowl element while the roller segment is in a mean angular position about an associated arm of the tripod element;

FIG. 6 is a view similar to FIG. 2, but partial, and of the joint in the position of maximum extension;

FIG. 7 is a semi-sectional view of a second embodiment of the joint, taken along line VII—VII of FIG. 8, only two roller segments being shown and the tripod element being shown in elevation;

FIGS. 8A and 8B are is a side elevational views of a section of the bowl element taken on line VIII—VIII of FIG. 7, the roller segments being shown in positions corresponding to two different positions of the arm of the tripod element in the bowl element;

FIG. 8C is a perspective view of a detail of the second embodiment;

FIGS. 9A and 9B are views similar to FIGS. 8A and 8B but showing the two roller segments in two positions corresponding to two other positions of the arm of the tripod element in the bowl element;

FIG. 10 is an elevational view of a clip comprising intermediate members and of a roller segment cooperating with the clip;

FIG. 14 is a view of the outer side of the roller segment shown in FIGS. 11 to 13;

FIG. 15 is an elevational view of the roller segment shown in FIG. 14;

FIG. 16 is a sectional view taken on line XVI—XVI of FIG. 15;

FIG. 17 is an end elevational view of the clip of the joint shown in FIGS. 11 to 16, with partial sectional views taken on planes XVIIa—XVIIa and XVIIb—XVIIb of FIG. 18;

FIG. 18 is an elevational view of the clip shown in FIG. 17, with a semi-section taken on plane XVIII—XVIII of FIG. 17;

FIG. 19 is a partial elevational view of a fourth embodiment of the joint partly in section, taken in plane XIX—XIX of FIG. 20;

FIG. 20 is a bottom view of the clip shown in FIG. 19, partly in section, taken in planes XXa—XXa and XXb—XXb of FIG. 19;

FIG. 21 is a view corresponding to a part of FIG. 19 when assembling or disassembling the joint;

FIG. 22 is a partial view in perspective and cross-section of the bowl element of the joint shown in FIGS. 19 to 21;

BRIEF DESCRIPTION OF THE PREFERRED EMBODIMENTS

Figures 12, 13:
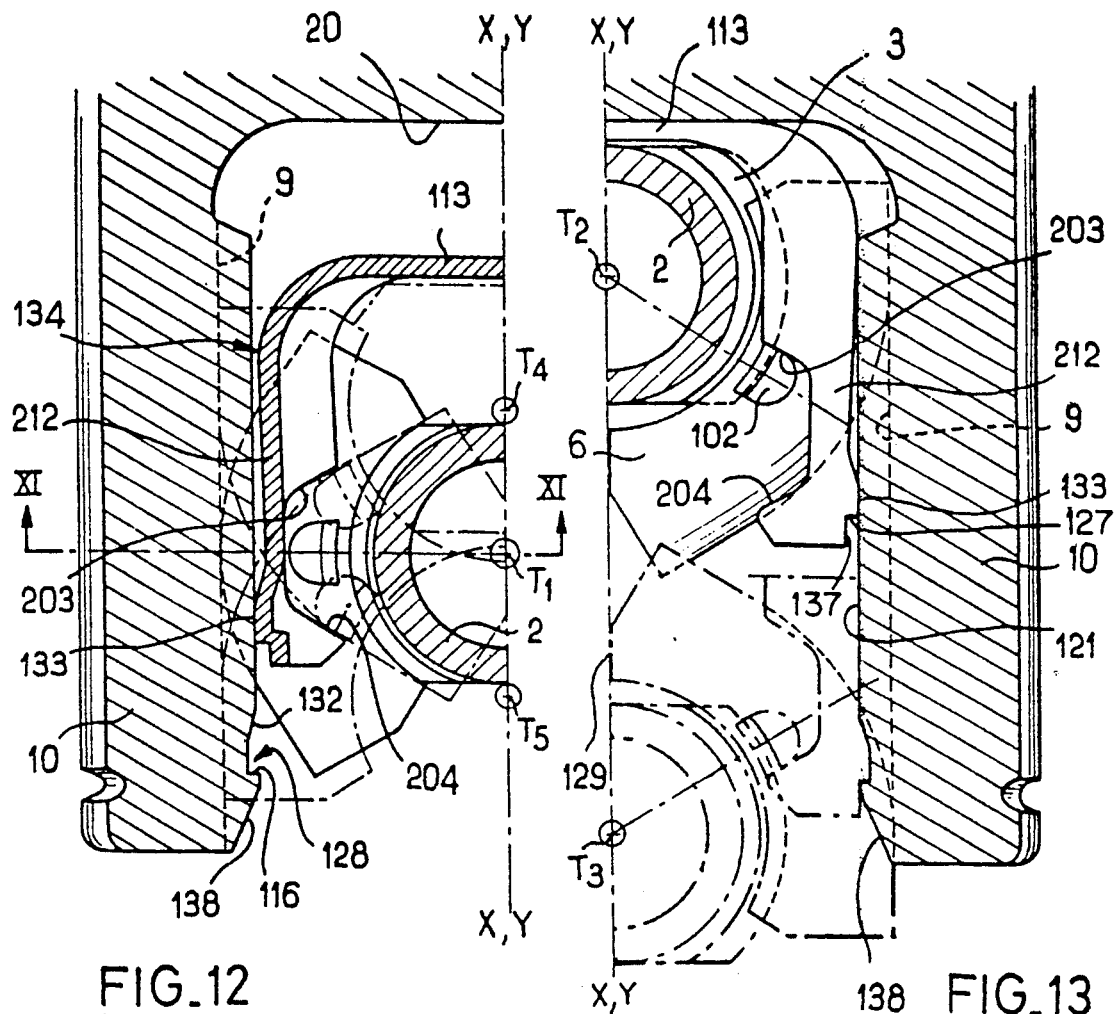
FIG. 12 is a semi-sectional view taken on line XII—XII of FIG. 11.
FIG. 13 is a semi-sectional view taken on line XII—XII of FIG. 11, showing in the same view the situation at the two ends of the telescopic travel of an arm of the tripod element.

In the example shown in FIG. 1, the homokinetic transmission joint comprises a first element, or tripod element, comprising a ring 1 having an axis X—X from which radially outwardly extend three radial arms 2 angularly evenly spaced about the axis X—X. The lateral wall of each arm 2 is formed by a convex spherical region 3 who center is located at a distance from the axis X—X. This tripod element is fitted and fixed on the driving shaft 4 which also has the axis X—X.

Each arm 2 of the tripod element is partly surrounded by two rolling elements, or roller segments, 6 whose radially inner concave spherical surface (relative to the axis of the arm) is in swivelling contact with the spherical region 3 of the arm. The radii of curvature of the spherical regions of the arm and the spherical surfaces of the roller segments are equal.

The roller segments 6 also comprise a radially outer toric surface ( relative to the axis of the arm) by which they are each in rolling contact with a respective one of six rolling tracks 9 provided inside a second element, or bowl element, 10 fixed to a second shaft 10a of the joint as shown in dot-dash lines in FIG. 2a.

The rolling tracks 9 extend in a direction parallel to the axis Y—Y of the bowl element 10 and the second shaft 10a of the joint, which axis is coincident with the axis X—X when the joint is in a position in which its two parts are coaxial. The toric surfaces 8 of the segments 6 have a circular cross-sectional shape, and the rolling tracks 9 have a circular cross-sectional shape of the same radius. The axis of the toric surface of each roller segment passes through the center T of its spherical surface, which coincides with the center T of the spherical region of the associated arm of the tripod element.

When the joint operates in contraction-extension (termed hereinafter telescopic movement), each arm 2 moves in a direction parallel to the axis X—X in the bowl element 10. When the joint operates at a flexed angle, i.e. when there is an angle A between the axis X—X of the tripod element 1 and the axis Y—Y of the barrel element 10 (FIG. 3), the plane of the tripod element, is the plane of the axes of the arms 2, is inclined relative to the axis Y—Y so that, upon each rotation of the shafts 4 and 10a, each arm 2 undergoes in the bowl element 10 a reciprocating movement in a direction parallel to axis Y—Y. The amplitude of this movement, which depends on the angle A between the axes X—X and Y—Y, is shown in FIG. 3 in which there have been shown respectively in full line and dot-dash line the same arm 2a at the two points of its travel corresponding to the two ends of the telescopic component of this travel at the angle A.

The expression telescopic movement is employed for the movement or the movement component of an arm 2 in a ( direction parallel to the axis Y—Y. The expression telescopic travel is employed for the extent of the telescopic movement.

It is desired that, in telescopic movements of normal extent, the roller segments roll without sliding in their associated rolling track 9 and slide by their inner spherical surface against the spherical surface 3 of the arm 2. However, the telescopic travel allowed by the simple rolling of the roller segments 6 in their respective track 9 is relatively limited. It is indeed at the maximum equal to the circumferential length of the toric surface 8. FIG. 2 shows one half of this travel: in the situation shown in full line (position T1 of the center. T), the roller segments are in a mean angular position about the axis Z—Z of the arm 2. In the position 6a shown in dot-dash lines, the roller segment 6 occupies one of its limit angular positions about the arm 2, which is shown only by the position T5 of the center T of its spherical region 3. Another semi-travel of the same length is possible beyond the position To up to a position of the arm 2 shown by the position T4 of the center of its spherical region. In this position, the segment 6 is at its other limit angular position about the axis Z—Z.

Means are provided to ensure that the angular travel of the segments 6 about the axis Z—Z does not exceed the aforementioned limit positions. In the illustrated embodiment, as an example of these means, the radially outer surfaces of the roller segments 6 comprise at each end of the section of a torus 8 a cylindrical sliding region 15 connected in a continuous manner to the section of a torus 8 and having a contour of the same radius corresponding to the radius of the contour of the tracks 9. Moreover, as clearly shown in FIG. 6, at each end of each segment 6, the cylindrical region 15 and the inner spherical surface are divergent, as shown by the directions L1 and L2 in FIG. 6, i.e. circumferentially outwardly of the segment, so that the arm 2 cannot be disengaged by a telescopic movement from a segment 6 in a limit angular position about the axis Z—Z.

In the joint according to the invention, it is arranged that, beyond either of the positions T4 and T5 of FIG. 2, each arm 2 is capable of effecting an additional travel until its center T reaches the position of maximum compression T2 or the position of maximum extension T3. This additional travel is achieved by the sliding of the cylindrical sliding regions 15 in the rolling tracks 9. This sliding occurs easily owing to the film of lubricant interposed between the two cylindrical surfaces 15 and 9. In the position of maximum compression T2, the limited angular position occupied by the segment 6 about the axis Z—Z constitutes a clearance position relative to a surface 101a of the arm 2, which is the front side relative the direction of movement toward this end of the telescopic travel (see position 6b in FIG. 3). The surface 101a is planar and parallel to the axis Z—Z in the same way as an opposite surface 101b of the arm 2 so as to limit the axial overall size of the joint for a given maximum telescopic travel. Owing to this clearance position of the roller segment 6, the surface 101a may very closely approach the inner surface 20 of the inner end of the barrel element 10.

Likewise, when the arm 2 travels from its position T5 to its limit position T3, the limit angular position occupied by the roller segment 6 corresponds to a clearance position relative to the front surface 101b of the arm 2, as shown in FIG. 6.

In this way, for a given maximum telescopic travel, the total axial overall size to be prescribed for the tripod element and the roller segments corresponds to the length of this travel increased by the distance between the surfaces 101a and 101b. No additional size is to be reckoned for the roller segments. The overall axial size of the joint is, consequently, particularly reduced.

However, if nothing else is provided, it is impossible to be sure that, in operation, the roller segments 6 will actually effect the whole of the angular travel about the axis Z—Z when the arms 2 effect their telescopic travel. On the contrary, it is to be feared that unwanted sliding between the segments 6 and the tracks 9, in particular when the roller segments are unloaded, angularly offset the roller segments about the arms 2. As a result of such offsets, the roller segments 6 are liable to be interposed between the arm 2 and the inner end 20 of the bowl element 10 and thereby prevent the arm 2 from reaching its position corresponding to the maximum compression of the joint. There is also a risk that they project beyond the surface 101b when the arm 2 is in the position corresponding to the maximum extension of the joint and thereby damage the rubber bellows or gaiter usually provided for connecting the free end of the bowl element 10 to the periphery of the shaft 4.

According to the invention, the roller segments 6 on one hand and the bowl element 10 on the other hand carry abutment means, 102, 103, 104 which, when the arms 2 are substantially at either end of their telescopic travel, retain by a mutual bearing relation the roller segments in their clearance position.

In the illustrated embodiment, the abutment means comprise, for each roller segment 6, a boss 102 carried by the segment 6 on its outer side, i.e. the side remote from the axis X—X. The boss 102, located mid-way circumferentially of the segment 6, has a plane of symmetry which is the transverse plane of symmetry 106 of the segment 6. The boss 102 has two symmetrical abutment surfaces, each composed of two planar faces 107 and 117, which make an angle E of about 60° (FIG. 2), equal to the angular travel of the segment 6 about the axis Z—Z. The two planar faces 107 and 117 are interconnected by a cylindrical surface 108 having an axis substantially parallel to the axis Z—Z when the axes X—X and Y—Y are coincident.

The abutment means pertaining to the bowl element 10 comprise for each roller segment 6 two abutment faces 103 and 104 facing each other and perpendicular to the axis Y—Y. Each face 103 and 104 is carried by an inner projection 109 which is preferably obtained by a localized press operation on the inner wall of the bowl element.

The faces 103 and 104 are located at equal distances from the plane perpendicular to the axis Y—Y and passing through the position T1 of the center T. In FIGS. 2 and 3, this plane coincides with the transverse plane of symmetry 106 of the segments 6.

Consequently, if a roller segment 6 occupies about the associated arm 2 an angular position remote from its clearance position as the arm 2 approaches one end of its telescopic travel (FIG. 5), the boss 102 comes in contact with the corresponding abutment face 103 or 104 of the bowl element 10, which prevents the boss 102 from continuing to travel in the direction of the end of the travel of the arm. This constrains the roller segment 6 to pivot to its clearance position about the arm 2, provided that there is a rolling movement without sliding of the toric surface 8 in the track and of one of the cylindrical surfaces 108 of the boss 102 against the abutment face 103 or 104, against which it bears. At the end of the movement, when the clearance position is reached, the planar face 107 adjacent to the aforementioned cylindrical surface 108 comes to bear against the abutment face 103 or 104. The position of the faces 103 and 104 and the angle between each planar face 107 and the plane of symmetry are so chosen that when the face 107 bears against the associated abutment face 103 or 104, on the one hand one of the cylindrical surfaces 15 is connected with the associated rolling track 9, and on the other, hand the center T of the associated arm is in the position T2 or T3. Consequently, at each end of the telescopic travel, the clearance position of the roller segments 6 corresponds to a respective one of their limit angular positions about the arm 2.

Thus when the arm 2 travels toward the inner end 20 of the bowl element 10, the cooperation of the bosses 102 and the abutment faces 103, the closest to the inner end 20, enable the arm 2 to reach its position T2 corresponding to the abutment of the end 111 of the shaft 4 against the end wall 20. The segment 6 cannot be interposed between the arm 2 and the end wall 20, which would prevent the joint from being completely compressed.

Upon an extreme extension of the joint, the abutment faces 104 cooperating with the confronting faces 117, 108 and 107 of the bosses 102 constrain the segments 6 to take up their clearance position in which they move only very slightly out of the bowl element 10, and therefore cannot create any hindrance as concerns the presence and the movement of the corrugated wall of the elastic sealing bellows.

Furthermore, as will be understood from FIG. 6, an additional extension of the joint is prevented. This is because of the mutual bearing relation of the bosses 102 and the abutment faces 104', the segment 6 cannot slide further in the direction of extension of the joint.

Further due to the angular travel limiting means (cylindrical surfaces 15), and also because of the mutual bearing relation of the the two segments 6 by their adjacent ends in front of the face 101a of the arm 2, the segments cannot pivot about the arms 2 beyond the clearance position.

Also, owing to the divergence between the directions L1 and L2, the arm 2 cannot be disengaged from between the associated segments 6.

In an intermediate region of the telescopic travel, the abutment means 102, 103, 104, have no action and therefore allow the roller segments to be freely positioned about the associated arm 2 within the angular limits defined by the limiting means, which are the cylindrical surfaces 15. The intermediate region is intended to mean the telescopic travel that the arm 2 must effect so that the boss 102 of a segment 6 travels from its bearing relation with one of the faces 103 or 104 to a bearing relation with the other of these faces 103 or 104. This intermediate region is variable as a function of the angular position of the segment 6 about the arm 2 when the boss 102 leaves the position in which it bears against one of the faces 103 or 104 and when the boss 102 bears against the other of these faces 103 or 104.

In normal operation, the arm 2 is located in the intermediate region of its telescopic travel, the roller segments 6 are also in an intermediate angular position between the limit angular positions, and telescopic movements of small extent are effected by rolling without sliding of the roller segments 6 in the tracks 9.

In the embodiment shown in FIGS. 7 to 10, the outer wall of the roller segments 6 only has the toric region 8. The boss 102 carried by each segment 6 has an active surface composed of two planar faces 118 and 118 which are symmetrical relative to the plane 106 and make an angle of about 120° and are substantially parallel to the axis Z—Z when the axes X—X and Y—Y are coincident.

The joint further comprises three intermediate means which, in the illustrated embodiment, are the three branches 112 of a clip interconnected by a base 113 of the clip facing the free end 111 of the first element (to which the tripod element pertains). The clip is made from a metal sheet which is cut or blanked out, bent and hardened. Each of the branches 112 extends between two rolling tracks 9 on which bear rolling segments associated with the same arm 2 of the tripod element. There is therefore one pair of rolling tracks 9 in each circumferential gap between two successive intermediate means. In this embodiment, the abutment means 102 of the roller segment 6 cooperate only indirectly with the abutment means of the bowl element 10, i.e. they cooperate with abutment surfaces 203 and 204 carried by the intermediate means 112 which in turn cooperate with the abutment means of the bowl element 10.

In this embodiment, the intermediate means 112 are fixed in the bowl element 10. For this purpose, the base 113 bears against the inner wall 20 of the inner end of the bowl element 10, which thus constitutes one of the abutment surfaces of the bowl element 10, while the ends of a free edge 114 opposite the base 113 of each intermediate means, or branch, 112 are clipped behind shoulders 116 facing toward the inner end 20, and provided in the inner wall of the bowl element 10, and thus constitute other abutment means against which the bosses 102 bear indirectly through the branches 112 when the associated arms 2 reach the position corresponding to the maximum extension T3 of the joint.

Each branch 112 presents to each adjacent roller segment 6 two abutment surfaces 203 and 204 which have, relative to a plane perpendicular to the axis Y—Y (plane 106 in FIG. 8B) an inclination of about 30°, so that a respective one of the planar faces 118a or 118b bears flatly thereagainst when the roller segment is in the corresponding clearing position (see FIG. 8A and FIG. 9B).

As an angular travel limiting means, each branch 112 has, for each associated roller segment 6, an abutment edge extending in a direction parallel to the axis Y—Y between the surfaces 203 and 204 associated with the same segment. As shown in FIG. 9A, the abutment edges 119 receive in sliding relation thereto either of the planar faces 118a or 118b of the bosses 102 when the roller segments 6 are in, respectively, one or the other of their limit angular positions about the arms 2. Bearing in mind the angle of 120° between the planar faces 118a or 118b, the allowed angular travel of the segments if 60°, which is the rotation to ensure that a boss 102 moves from the position in which its planar face 118a bears against the edge 119 to the position in which its planar face 118b bears against the edge 119. The concave angle formed by the edge 119 with each abutment surface 203 and 204 is equal to the convex angle of the two planar faces 118a and 118b of each boss 102, so that at each end of the telescopic travel of an arm, one of the planar faces 118a, and 118b of each segment 6 bears against the corresponding abutment surface 203 or 204, and the other against the abutment surface 119.

With reference to FIG. 9A, when the center of the arm 2 occupies the position T4 and travels toward the limit position T2 and the roller segment 6 already occupies the limit angular position corresponding to the clearance position for the end of the travel T2, the planar face 118b of the boss 102 slides along the longitudinal abutment surface 119 of the clip until the other planar face 118a of the same boss comes to abut against the abutment surface 203 of the clip when the center of the arm reaches the position T2 (right part of FIG. 9B).

Figure 11:
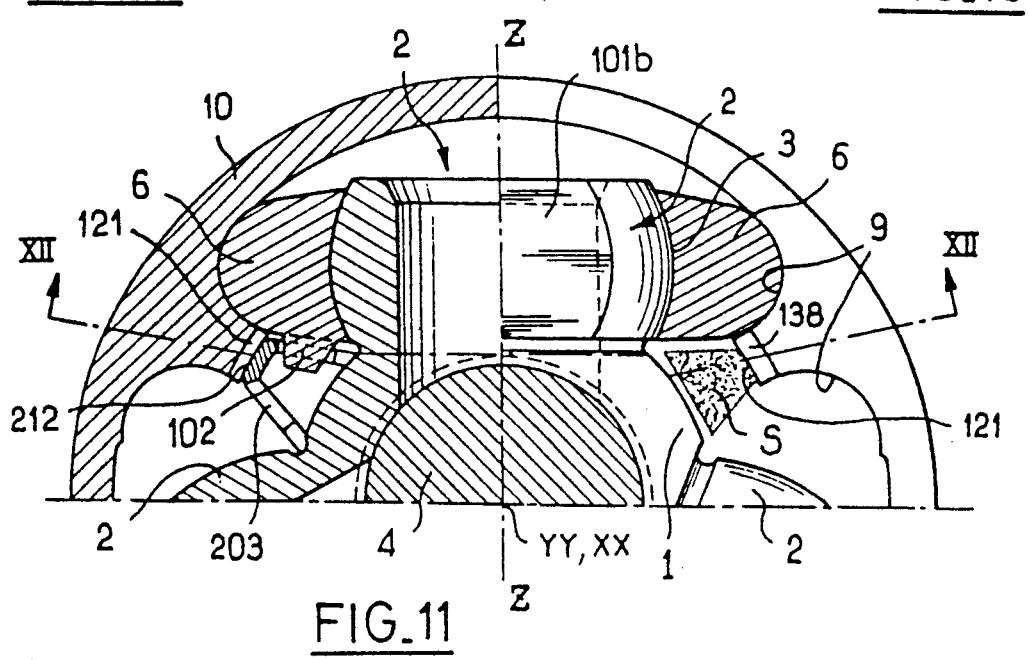
FIG. 11 is a view of a third embodiment of the joint, partly in cross-section taken on line XI—XI of FIG. 12.

FIG. 11 is common to the two embodiments shown in more detail in FIGS. 12 to 24. These embodiments also employ an intermediate means 212 constituting the branches of a clip interconnected by a base 113 (FIG. 13) located between the tripod element and the inner end of the bowl element 10. However, the branches 212 now extend in the section S (shaded in FIG. 11) located between the adjacent rolling tracks 9 against which bear roller segments 6 associated with different arms 2 of the tripod element. In other words, the branches 212 are located between the ring 1 and the bore 121 of the heel between two tracks 9 cooperating with the different arms 2. In this way, the branches 212 are at a distance from the axis Y—Y which is reduced by about 20 mm.

Under these conditions, in order to allow the free angular movement of the shaft 4 when the joint is completely compressed (T2 in FIG. 13), it is necessary to arrange that the abutment surfaces 204 against which the bosses 102 bear in the other extreme position (position T3 in FIG. 13)
are withdrawn so that they do not interfere with the shaft 4, which during the rotation of the joint at a flexing angle describes, with respect to the bowl element 10, a conical surface centered at T2 and having a semi-angle at the center which is equal to the operating flexing angle of the joint, i.e. the angle between the axes X—X and Y—Y (such as the angle A in FIG. 3).

In the two embodiments shown in FIGS. 11 to 24, the segments 6 are of the type shown in FIGS. 14 to 16. They are identical to the segments shown in FIGS. 1 to 3 except that the boss 102 has two opposed parallel planar faces 123 which are parallel to the plane 106 in FIG. 15 and interconnected by a semi-cylindrical surface 122 facing away from the axis Z—Z, and are substantially parallel to the latter when the axis X—X of the tripod element and the axis Y—Y of the bowl element 10 are coincident.

The toric rolling region subtends an angle B of about 60°. The inner spherical bearing region 124 subtends an angle C of about 120°.

The clip having three branches 212 (FIGS. 17 and 18) is obtained by blanking, press forming and hardening a steel sheet. The three branches have a U-sectioned shape which is open toward the axis Y—Y, and the base 113 is substantially triangular.

The wings of U—shaped section are locally notched to provide sliding abutment surfaces 203 and 204, which are inclined at 60° to the axis Y-Y, Thus, when the segments 6 are in their limit angular position and the bosses 102 are in contact with an abutment 203 or 204, one of the planar faces 123 bears flat against the abutment.

The clip axially floats within the bowl element 10. For this purpose, the back of the U-sectioned shape of each of the three branches is axially slidable on the bearing surfaces formed by the bore 121 between the tracks 9 associated with the different arms 2.

Each branch 212 carries on its rear side in the vicinity of its free end a lug 126 which is press-formed when forming the clip. This lug defines a step 127 which is perpendicular to the axis Y—Y and faces away from the base 113. An extreme position of extension of the clip relative to the bowl element 10 is defined by the clipping of the step 127 in a notch 128 which has a substantially complementary contour and is formed by a turning operation in the bore 121 of the bowl element in the vicinity of the opening of the latter. In particular, the notch 128 has a surface 116 facing toward the inner end 20 of the bowl element and constitutes one of the abutment means related to the bowl element.

Consequently, when the arm 2 reaches its limit position T3 (FIG. 13), the boss 102 bears against the surface 204 and in this way constrains the segment 62 to take up its clearance position, while the displacement of the clip toward the opening of the bowl element 10 is limited by the bearing of the step 127 of the branches 112 against the surface 116 of the notches 128. In this position, two ends 129 of the two segments associated with each arm are in abutting relation to each other.

In the other extreme position of the arm, the boss of each segment 6 bears against the other abutment surface 203 of the branches 112. The segments 6 are in their clearance position, in abutting relation to each other at their two other ends. The displacement of the clip toward the interior of the bowl element 10 is limited by the bearing of the base 113 against the inner end wall 20 of the bowl element, which constitutes the other abutment means related to the bowl element 10 (see position T2 of FIG. 13).

The lugs 126 and the notches 128 have opposite their step 127 and shoulder 116, respectively, surfaces 131 and 132 having complementary slopes permitting the lugs 126 to leave the notches 128 in the direction toward the inner end of the bowl element by a bending of each arm relative to the base 113. Thereafter, and up to the position of maximum compression T2, the clip is guided in the bore 12 in the region of a back 133 of the lug 126 and in the region of a beginning portion 134 of the bend connecting the branches 212 to the base 113.

In operation of the joint, the telescopic movement between the positions T4 and T5 can occur by a rolling of the segment 6 on the rolling track 9 of the bowl element without displacement of the floating clip. The boss 102 has, between the surfaces 203 and 204, sufficient clearance for this purpose. Such a travel corresponds to the usual needs in normal use of the joint.

In exceptional circumstances, when an additional sliding is required, the segment 6 slides on the rolling track 9, bearing against one of its cylindrical regions 15, and axially shifts the floating clip up to position T2 in compression or T3 in extension of the joint.

The total telescopic travel is therefore equal to the distance T2-T3.

The joint is assembled, with no special arrangement, by inserting in the barrel element the shaft 4 on which is fixed the tripod element provided with its six roller segments 6 and capped with the floating clip 212, 113 (as shown in FIGS. 12 and 13 for the positions T1, T2, T4, T5). The ends of the branches 212 of the clip slightly bending inwardly about elastic bending axes 136 of planar regions of the base 113 (FIG. 17).

For taking the joint apart, it is sufficient to slip, in position T3, the end of a screwdriver between the end 127 of the branches 212 and the chamber 138 of the bowl element 10 to unclip the clip (FIG. 13) and release the shaft 4 equipped with the tripod element, the segments 6 and the clip.

The embodiment shown in FIGS. 19 to 24 will only be described with respect to its differences from the preceding embodiment.

The lug 126 for axially retaining the clip is press-formed close to the end of the branches 212 at which the latter are connected to the base 113. Consequently, the lug 126 cannot be radially withdrawn, since it is located substantially in the plane of the base 113 of the clip. An abutment ledge 139 is advantageously inclined at 45° to facilitate the cold forming thereof.

A back surface 141 of each branch is slidable within the bore 121 of the bowl element. A radially outermost part 142 of the press-formed lug 126 is guided inside a counterbore 143, which extends approximately in one half of the length of the rolling tracks between the inner end 20 of the bowl element 10 and a step 144 inclined at 45°facing the inner end 20.

FIG. 19 shows the clip in its outermost position relative to the bowl element 10. The arm, in position T3, and the roller segments 6 are shown in dot-dash lines. The clip alone is shown in dot-dash lines in the innermost position thereof at the top left of FIG. 19. The operation for the various circumstances relating to positions T0 to T5, is substantially the same as in the preceding embodiment.

In the outermost position of the clip relative to the bowl element, the abutment ledge 139 of the lug 126 abuts against the step 144, which constitutes one of the abutment means of the bowl element 10.

The abutment in the innermost position of the clip in the bowl element occurs simply by the bearing of the base 113 against the inner end 20, which constitutes the other abutment means of the bowl element.

Figure 23:
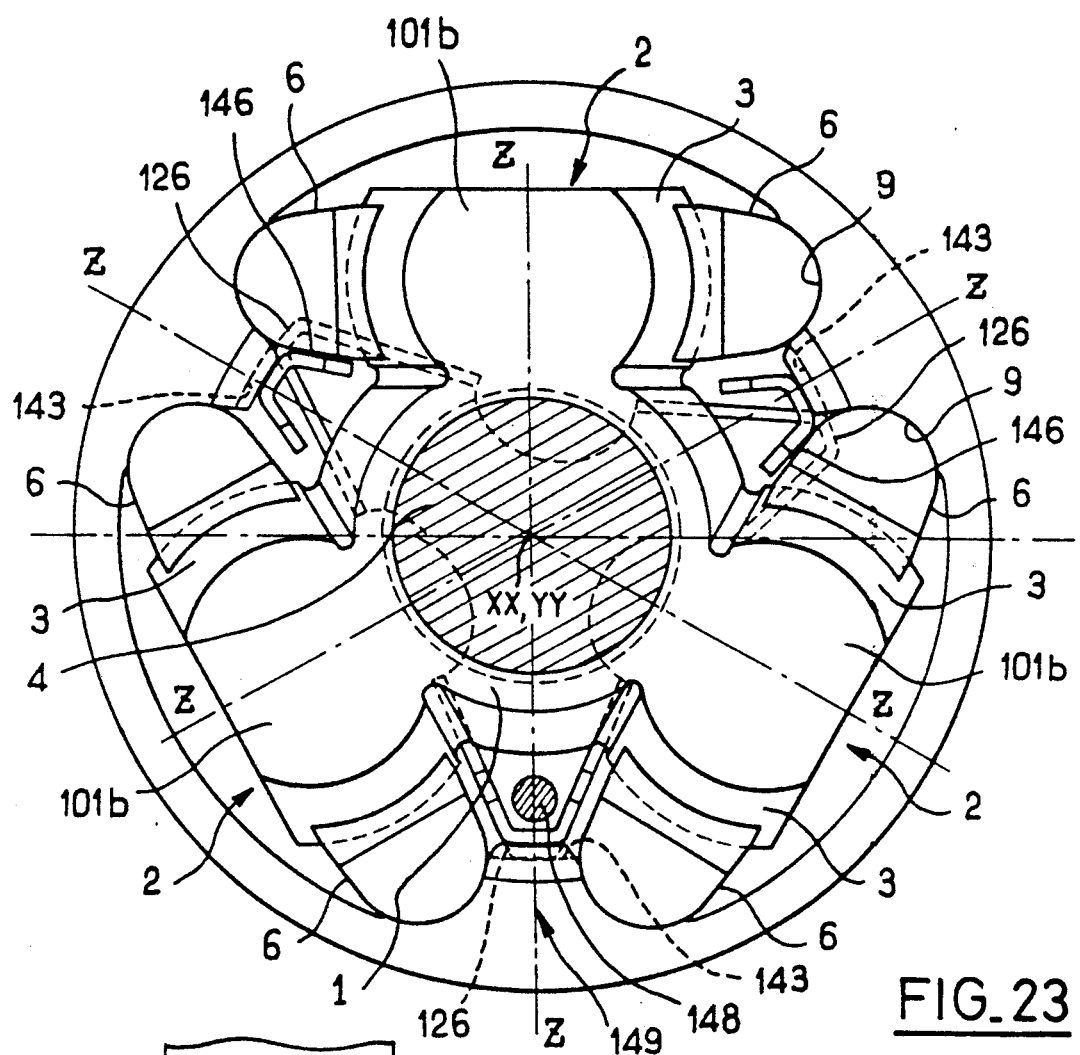
FIG. 23 is an end elevational view of the joint shown in FIGS. 19 to 22 when assembling or disassembling in the upper part and in the assembled state in the lower part, the abutment bosses of the segments being omitted in order to render the drawing more clear.

FIGS. 21 to 23 show the principle of the assembly of this embodiment of the floating clip.

The diameter of the circumference circumscribing the radially outermost parts 142 of the lugs 126 is a few millimeters larger than the bore 121. The clip is engaged in the bowl element after a rotation on the order of 5° to 10° relative to the bowl element about the axis Y—Y. As shown in the upper part of FIG. 23, the lugs 126 place themselves in the available space radially against the chamfered edges of the rolling tracks 9, and the clip, together with the assembly of the shaft 4, the tripod element and the roller segments 6, are engaged until the position shown in FIG. 21 is reached. In this position, the roller segments 6 take up a tangent position relative to the outer wall 146 of the U-sectioned shape of the end of the branches 112 of the clip. This wall 146 partly encumbers the entrance of the rolling track 9 owing to the aforementioned rotation through 5° to 10°. An axial compression force is then exerted on the assembly and this has for effect, by forcing the toric surfaces 8 of the segments 6 to enter their rolling tracks 9, to exert a bending moment on the branches 212 of the clip. These branches bend elastically due to the relative torsional flexibility of the shaded section 147 of their base 113 about the axes OP, OQ and OR (FIG. 20) by inclining, in accordance with helices having a very large pitch on the general axis Y—Y, as shown diagrammatically in FIG. 23. The assembly then slides toward the interior of the bowl element 10 and the clip expands and resumes its normal configuration as soon as the lugs 126 reach the counterbore 143.

The sliding assembly is in this way positively locked within the bowl element 10, as shown by the lower part of FIG. 23 and FIG. 19.

The joint is disassembled by unlocking the clip. The tripod element is placed in the position T3 (FIG. 19). A screwdriver 148 is inserted inside the U-shaped contour of the branches of the clip (FIG. 23). As the bowl element 10 is fixed, a bending moment is applied to each of the branches by means of the screwdriver about the axis 149, while exerting a pull on the shaft 4 of the tripod element. The base 113 of the clip and the three lugs 136 turn, as shown in the upper part of FIG. 23, and the assembly comprising the shaft, the tripod element, the roller segments and the clip can be extracted from the bowl element without difficulty.

Figure 24:
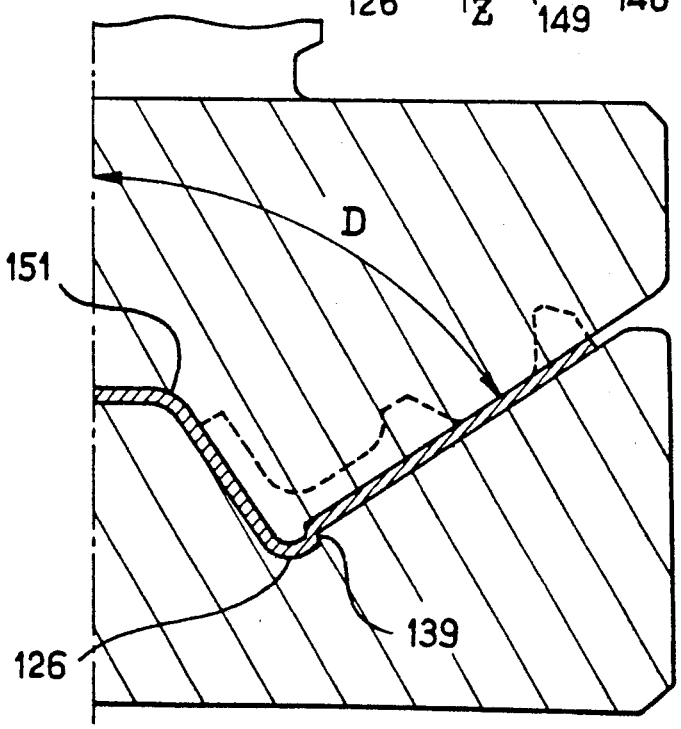
FIG. 24 is a sectional view of a forming die for manufacturing the clip intended for the joint shown in FIGS. 19 to 23.

The press-forming of the floating clips with their lugs is easily carried out on a blank cut or blanked from sheet steel by means of a simple and conventional forming tool, diagrammatically shown in FIG. 24.

To this end, the press-forming is carried out with the branches opened at an angle D of 45° to 60° by folding at 151 the base about the axes 136 (FIG. 17) or the axes of the regions 147 (FIG. 20), which permits the easy forming of the lugs 126 and the ledges 139, which are undercut in the finished part.

After press-forming, the folds 151 are straightened and the clip is terminated and ready to be hardened.

In each of the embodiments just described, the centrifugal force due to the rotation of the joint about its axes X—X and Y—Y, which may be coincident, urges the roller segments 6 toward an intermediate angular position termed the "neutral" position located angularly midway between the two limit angular positions.

This return is in particular effective for the segments 6 which are non-loaded, depending on the direction of the torque.

Figure 25:
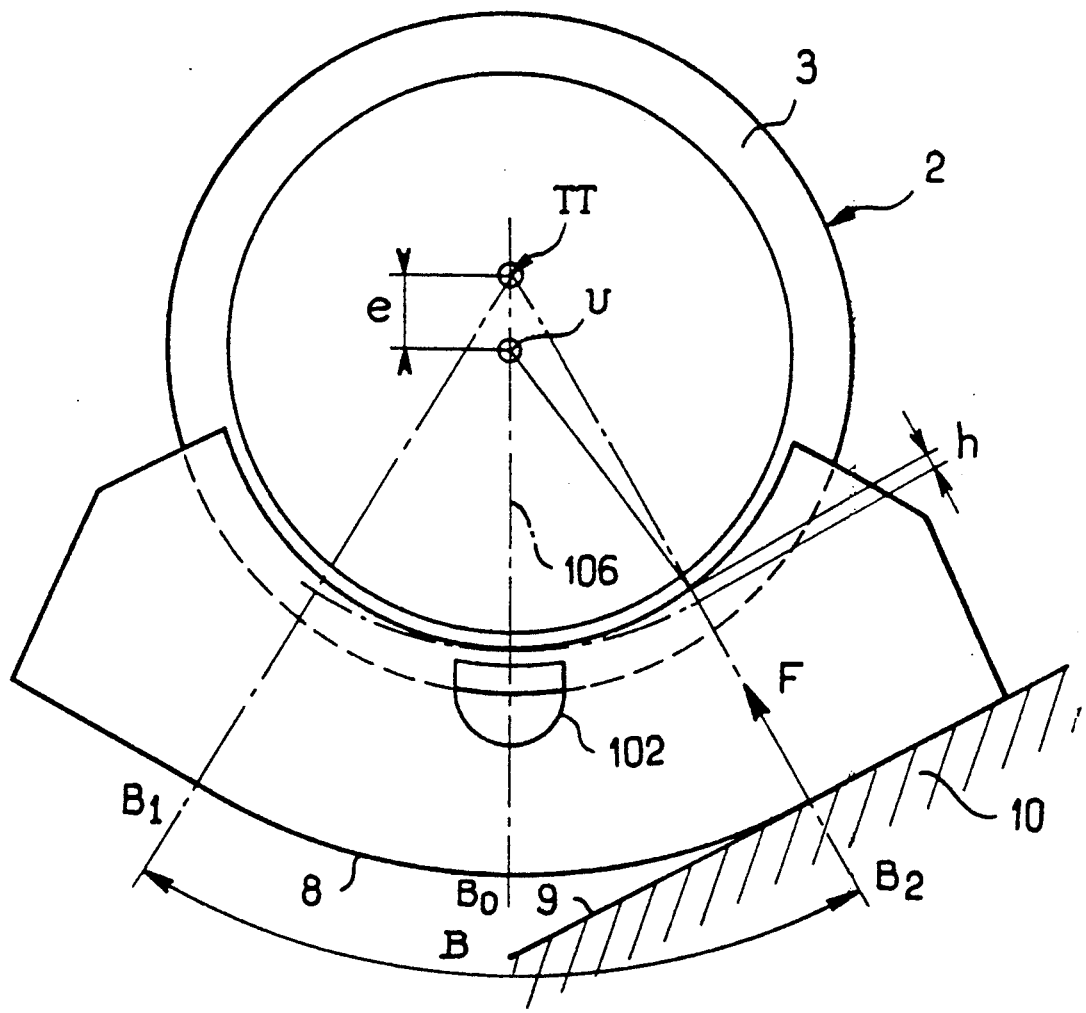
FIG. 25 is a diagrammatic view along the axis of an arm of the tripod element showing an improvement applicable to the preceding embodiments.

As shown in FIG. 25, for the purpose of increasing the return effect in respect of the segments 6 which are under load, it is advantageous to arrange that the center U of their inner spherical bearing surfaces have, relative to the axis T—T of the toric surface 8, a slight offset or ecccentricitye of a fe tenths of a millimeter in the direction toward the considered segment 6, along the direction Bo, which is at the intersection of the plane 106 and a longitudinal median plane of the segment 6.

Thus, the thickness, or the radial dimension, of the segment 6, is slightly smaller in the circumferential middle, than at the two ends B1 and B2 of the angle B of the toric region 8, and gradually increases on each side of the plane 106 toward the ends B1 and B2.

This offset has the effect of creating a centering return when the segment is loaded, without the very slight increase in thickness at the ends B1 and B2 presenting any drawback.

FIG. 25 represents in a very exaggerated manner this 10 offset. For example, an offset "e" of 0.3 mm when the spherical bearing surface has a radius of 16 mm creates at the ends of the angle B a radial thickening "h" of about 0.04 mm.

The return slope at the ends of the angle B is about 1% and produces a return force F of 5 kg for a load of 500 kg on the segment.

Consequently, during the operation of the joint, the segments always tend to resume a zero inclination, which has the advantage of conserving the availability of the whole of the rolling travel.

To summarize, it is found that the devices of the described invention have the following advantages: the combination angularity/sliding has the most extended diagram of utilization for a given axial size and diameter of the barrel element. The conventional system for preventing the joint from coming apart by means of a cap which is set in position is replaced, the overall size of the joint is reduced and the risks of leakage and damage to this cap are eliminated. The operation of the device is absolutely reliable. The assembly and disassembly of the joint is failed. The production and assembly of the device can be achieved at a low cost.

I claim:

1. A telescopic transmission joint, comprising:
   a first element having an axis of rotation, said first element having three arms disposed substantially radially relative to said axis;
   a second element having an axis of rotation, said second element defining a cavity having a plurality of longitudinal rolling tracks;
   two roller segments partly surrounding each said arm for rolling engagement with respective said longitudinal rolling tracks and pivotable about their respective said arm, each said roller segment defining radially outer surfaces having a curved transverse contour, whereby each said arm of said first element is telescopically movable relative to said cavity of said second element through a range of travel;
   angular travel limiting means on each said roller segment for limiting the angular range of movement of each pair of said roller segments about their respective said arms, said angular travel limiting means comprising cylindrical portions extending from each said roller segment for engagement with said rolling tracks to limit the rotation of said elements relative to said rolling tracks; and
   abutment means for defining a predetermined range of movement for said roller segments along said longitudinal rolling tracks and causing each said pair of roller segment to reach a limit of their angular range of movement about their respective said arm, defined by said angular travel limiting means, when their respective said arm moves to an end of its range of travel, said predetermined range of movement for said roller segments including an intermediate range of movement whereat said roller segments can freely pivot about their respective said arm within the limits defined by said angular travel limiting means, and said abutments means including abutment portions carried by said roller segments and abutment portions carried by said second element.

2. The transmission joint as set forth in claim 1, wherein:
   said cavity of said second element has first and second ends, said arms of said first element being at said first end corresponding to telescopic compression of the joint and said arms of said first element being at said second end corresponding to extension of said joint; and
   when said arms are at an end of their range of travel corresponding to maximum extension their respective said roller segments are in a position at a limit of their angular range of movement, said roller segments having at said inner position inner surfaces comprising regions convergent in a direction away from said second element so as to retain their respective said arms therebetween and define an end of the range of travel of said arms.

3. The transmission joint as set forth in claim 1, wherein:
   said abutment portions carried by said roller segments comprise abutment surfaces and said abutment portions of said second element comprise abutment surfaces, at least some of said abutment surfaces of said abutment portions of said roller segments having a curved convex region for slidably rolling against associated abutment surfaces of said abutment portions of said second element when a said arm of said roller segments moves toward an end of its range of travel.

4. The transmission joint as set forth in claim 1, wherein:
   said radially outer surfaces of said roller segments comprise a section of a torus and cylindrical sliding regions connected to either end of and continuous with said section of a torus.

5. The transmission joint as set forth in claim 1, wherein:
   said abutment portions of said roller segments comprise bosses disposed on sides of said roller segments.

6. The transmission joint as set forth in claim 5, wherein:
   each said roller segment has one of said bosses, each said boss having two abutment regions, each for bearing at least indirectly against an abutment portion of said second element when said respective arm of said roller segment is at an end of its range of travel.

7. The transmission joint as set forth in claim 5, wherein:
   each said boss is located substantially midway along the circumferential extent of its roller segment.

8. The transmission joint as set forth in claim 1, wherein:
   said abutment portions of said roller segments are directly cooperable with said abutment portions of said second element.

9. The transmission joint as set forth in clam 1, and further comprising:
   a plurality of intermediate means mounted in said second element between said longitudinal rolling tracks for cooperation with and between said abutment portions of said roller elements and said abutment portions of said second element.

10. The transmission joint as set forth in claim 9, wherein:
    each pair of successive said intermediate means in said second element has a circumferential gap therebetween, each said gap having a pair of said longitudinal rolling tracks therein, and each said intermediate means having abutment portions cooperative with said roller segments of said longitudinal rolling tracks on either side thereof.

11. The transmission joint as set forth in claim 10, wherein:
each said intermediate means extends between two said rolling tracks against which bear rolling segments of different said arms of said first element.

12. The transmission joint of claim 9, wherein:
said first element has a free end; and
s aid plurality of intermediate means has a base interconnecting themselves, said base being located in confronting relation to said free end of said first element.

13. The joint as set forth in claim 12, wherein:
said second element has a free end;
said abutment portions of said second element comprise a plurality of steps on said second element facing away from said free end of said second element;
said second element further has a plurality of recesses located behind respective said sets adjacent respective said longitudinal rolling tracks; and
said plurality of intermediate means have, adjacent said base, a plurality of bosses for engagement with said recesses, whereby said plurality of intermediate means are provided such that they have sufficient flexibility relative to each other to enable s said boss to occupy a said rolling track adjacent a said recess while a free end of said intermediate means having a said boss is located outside of said rolling tracks adjacent a said recess in order to permit the engagement and disengagement of said roller segment associated with said rolling tack during assembly and disassembly of the joint.

14. The transmission joint as set forth in claim 9, wherein:
said second element comprises means for slidably mounting said plurality of intermediate means therein for slidably movement parallel to said axis of rotation of said second element such that said slidable movement of said plurality of intermediate members is limited by said abutment portions of said second element.

15. The transmission joint as set forth in claim 14, wherein:
each said intermediate means has a coupling portion for coupling itself with a respective said abutment portion of a said rolling segment, each said coupling portion having a predetermined clearance in a direction parallel to said axis of rotation of said second element.

16. The transmission as set forth in claim 1, and further comprising:
return means for returning said roller segments to an intermediate angular position between the limits defined by said angular travel limiting means.

17. The joint as set forth in claim 16, wherein:
said return means comprises a radial dimension of each said roller segment increasing on each side of a median transverse plane of said roller segment.

* * * * *